Patented July 5, 1927.

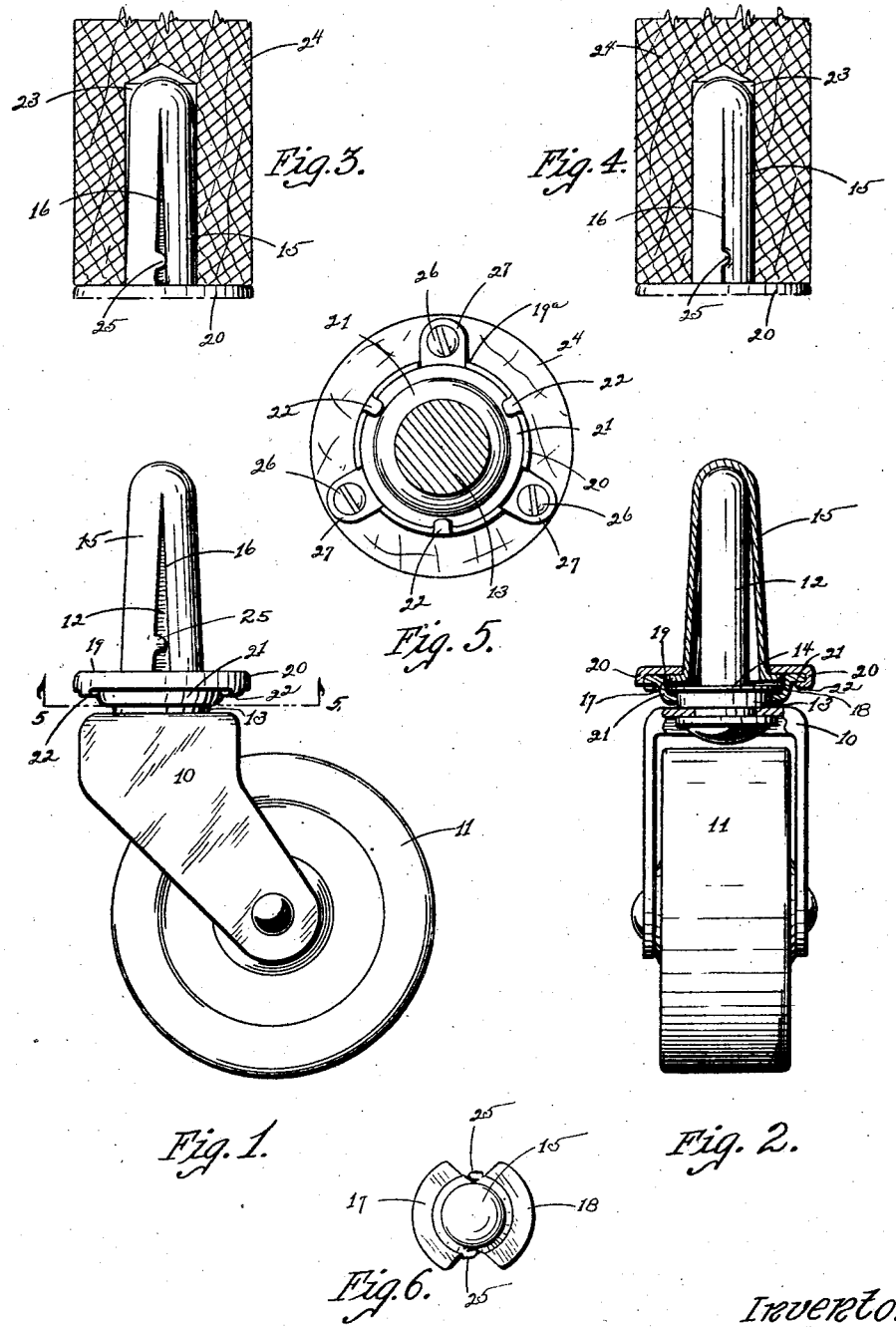

1,634,631

UNITED STATES PATENT OFFICE.

EDWARD SCHULTZ, OF CHICAGO, ILLINOIS, ASSIGNOR TO JAMES B. LADD, OF DES MOINES, IOWA.

CASTER.

Application filed June 16, 1925. Serial No. 37,445.

The primary object of the present invention is to provide an improved construction for a swiveling caster which is adapted for use with a considerable variety of objects, such as refrigerators, pianos, and washing machines having legs of different construction.

A further object of this invention is to provide an improved swivel caster in which a relatively large caster stem may be employed and at the same time the diameter of the swiveling sleeve or yoke need not be made unduly large, thus making the device more nearly universal in its applicability to varying load objects.

A further object of the invention is to provide improved means for connecting the swiveling sleeve to the disk plate which carries the load and transfers the weight through said swiveling sleeve to the top of the caster stem.

A further object of this invention is to provide improved means for centering the lower end of the caster stem and preventing undesirable lateral movement or play.

A further object of the invention is to provide improved inter-engaging means for the two parts of the split swiveling sleeve, which yet may be caused to yield through the application of considerable force when it is desired to insert the sleeve in a socket or bore of somewhat smaller diameter than that for which it is designed.

With these and other objects in view, my invention consists in the construction, arrangement and combination of elements hereinafter set forth, pointed out in the claims and illustrated by the accompanying drawing, in which—

Figure 1 is a side elevation of a swivel caster embodying my invention.

Figure 2 is a view at right angles to Figure 1, the swiveling parts being shown in section.

Figure 3 is a view showing the swiveling sleeve in position for use in a socket in a load object, the latter being shown in section.

Figure 4 is a similar view showing the swiveling sleeve in the position assumed when forced into a socket or bore of less diameter than the normal.

Figure 5 is a cross-section on the line 5—5 of Figure 1, showing a slightly modified form as to the attaching means.

Figure 6 is a plan view of the split swiveling sleeve.

In the construction of the device as shown a caster of common form is employed, including a fork 10, a wheel 11 journaled therein, and a stem 12 rising from the top of the fork. Near its lower end the stem 12 is enlarged or formed with an integral peripheral flange 13, the lower surface of which rests on the top of the fork 10, and this flange 13 is further enlarged at its upper margin and formed with a relatively thin peripheral flange or shoulder 14. A swiveling sleeve 15 is provided, stamped from a strip of metal and so formed that its upper end portion is closed and of substantially cylindrical form and adapted to rest and have a swiveling bearing on the upper end of the caster stem 12. The sleeve 15 is of metal having resilient characteristics and the halves thereof flare apart somewhat downwardly and are separated by vertical slits 16 of V-form. At its lower end the split sleeve 15 is formed with a pair of opposed, outturned horizontal flanges or feet 17, 18, one on each half of the said sleeve.

A disk plate 19 is provided and is formed with a central opening of sufficient diameter to receive rather loosely the lower end portion of the split sleeve 15 so that said sleeve may rotate freely therein even when expanded to its full normal size. The disk plate 19 is formed with a downturned marginal flange 20, and said disk plate rests on and is supported by the horizontal flanges 17, 18 of the split swiveling sleeve. An embossed disk 21 also is provided, which has the functions of retaining the flanges of the split sleeve in the disk plate 19 and also of centering the lower end of the caster stem relative to the split sleeve and the disk plate. The embossed disk 21 is formed with a relatively large central opening which fits rather snugly the flange 13 of the caster stem, and when the parts are assembled serves to center said stem at its lower end. The boss of the disk 21 is arranged downwardly, and the periphery of the said disk is received within the peripheral flange 20 of the disk plate 19 and retained by means of a series of marginal lugs on said flange, in this instance three in number and designated by the numeral 22, which lugs are bent against the lower face of the embossed disk 21. The enlarged flange or shoulder 14 of the caster stem is thus received and retained within the boss of the disk 21 and between it and the flanges 17, 18 of the split sleeve 15, and the caster stem is free to rotate or swivel in the sleeve and the embossed disk 21.

In practical use the device is assembled as shown and described, with the swiveling sleeve 15 embracing the caster stem 12, and after said stem is secured to the fork 10 the sleeve is held in such relation by the interengagement of the flanges 17, 18 with the disk plate 19 and disk 21, said parts in turn being secured together by the lugs 22 and at the same time engaging with the peripheral flange or shoulder 14 of the stem. The swiveling stem is adapted to be inserted in a bore or socket such as 23 in a load object, which may be a furniture leg such as 24 or it may be a suitable bracket adapted to be attached to an object. The bore or socket 23 is of such diameter that the split sleeve 15 will have a tight fit therein and be compressed by being placed in position, the two halves springing toward each other because of such fit and frictionally engaging the walls of the bore or socket to hold the device in place. The sleeve 15 is inserted until the disk plate 19 contacts the lower surface of the load object 24 which rests thereon, the weight being transferred through the contact of said disk plate with the flanges 17, 18 to the swiveling sleeve 15, which in turn is supported on the upper end of the caster stem 12 and is free to rotate or swivel thereon. This arrangement whereby the weight is transferred to the upper end of the caster stem reduces friction to a minimum and permits very free and easy swiveling of the caster relative to the sleeve and the load in use.

The swiveling sleeve 15 preferably is formed with a tooth or lug 25 projecting from one margin of the lower portion of each V-shaped slit 16 and adapted to abut and contact with the margin of the other member of the sleeve when compressed by insertion in a bore or socket, as shown in Figure 3. This mutual contact serves to assist in supporting the members of the split sleeve and preventing collapse or distortion thereof under a load, and yet the point of contact is so relatively small that upon occasion the tooth or lug 25 may be forced to bite into and penetrate the metal of the opposite member when it is necessary to force the sleeve into a bore or socket of somewhat smaller than the normal diameter, as shown in Figure 4. Under such conditions the supporting function is still present, and it will be seen that the device is thus not limited to use in a bore or socket of exact size.

If desired the lower portion of the tooth or lug 25 may be turned outwardly out of the plane of the wall of the sleeve, as indicated by dotted lines in Figure 1, so that it will have the additional function of tending to prevent withdrawal of the sleeve from the socket or bore, by engaging the wall thereof; but in the main I depend upon the frictional contact of the spring sleeve with the walls of the socket or bore to hold it in place.

In Figure 5 I have indicated a form which may be used at times, particularly for very heavy load objects such as pianos. The disk plate 19ª is provided with means whereby screws 26 may be inserted into the load object, which may be done by enlarging the diameter of the disk plate or by providing projecting ears 27 on its periphery with holes for the screws.

I claim as my invention—

1. The combination of a caster having a stem and a swiveling device comprising a longitudinally split spring sleeve closed at its upper end and adapted to embrace and rest on said stem, the members of said sleeve being formed at their lower ends with outturned flanges, a disk plate of annular form adapted to embrace loosely said sleeve and rest on said flanges, an embossed disk embracing said stem below said disk plate and having a downwardly extending boss in its central portion, means to prevent downward movement of said stem relative to said embossed disk by engagement between said central boss and the flanges of said spring sleeve, and means for securing said embossed disk and disk plate together.

2. The combination with a caster having a stem and a swiveling device comprising a spring sleeve closed at its upper end and adapted to embrace and rest on said stem, said sleeve being formed at its lower end with flanges, an annular disk plate loosely embracing said sleeve and resting on said flanges, a centering disk embracing said stem below the disk plate and serving to center the lower end of said stem by close contact therewith, said disk plate being formed with a peripheral flange extending downwardly past the periphery of said centering disk and formed with marginal lugs bent underneath said centering disk for securing said centering disk to said disk plate.

3. The combination with a caster having a stem and a swiveling device comprising a spring sleeve closed at its upper end and adapted to embrace and rest on the upper end of said stem, said sleeve being formed at its lower end with flanges, an annular disk plate loosely embracing said sleeve and resting on said flanges, an embossed disk having a central opening and mounted on said stem below said disk plate and secured thereto at its periphery, said disk having its central portion embossed downwardly and a shoulder on said stem within the boss of said disk and serving to prevent downward movement of said stem relative thereto.

4. The combination with a caster having a stem and a swiveling device comprising a spring sleeve closed at its upper end and adapted to embrace and rest on the upper end of said stem, said sleeve being formed at its lower end with flanges, an annular disk plate loosely embracing said sleeve and resting on said flanges, said disk plate being formed with a downturned peripheral flange, an annular disk having a downwardly extending boss and having its periphery received within the flange of said disk plate and secured thereto, said stem being formed with a two-diameter flange within the boss of said disk, one portion of said flange serving to center the stem in the central opening of said disk and the other being of greater diameter than the central opening of said disk and serving to prevent downward movement of the stem relative to the disk.

5. The combination with a caster having a stem and a swiveling device comprising a spring sleeve closed at its upper end and adapted to embrace and rest on the upper end of said stem, said sleeve being formed at diametrical points with longitudinal slits and also with flanges at the lower ends of its members, said sleeve adapted to be inserted in and frictionally engage the walls of a socket, the margins of each slit being normally spaced apart and one wall of each slit of the spring sleeve being formed with a projecting tooth adapted to abut the opposite wall of the slit and bear against the same in normal use and to be forced into the metal of said wall at times, and an annular disk plate loosely mounted on the sleeve and resting on the flanges thereof, said disk plate adapted to engage the lower surface of the socket.

Signed at Chicago, in the county of Cook and State of Illinois, this 27th day of April, 1925.

EDWARD SCHULTZ.